US007757066B2

(12) United States Patent
Jarvis et al.

(10) Patent No.: US 7,757,066 B2
(45) Date of Patent: Jul. 13, 2010

(54) SYSTEM AND METHOD FOR EXECUTING VARIABLE LATENCY LOAD OPERATIONS IN A DATE PROCESSOR

(75) Inventors: Anthony X. Jarvis, Acton, MA (US); Paolo Faraboschi, Brighton, MA (US)

(73) Assignees: STMicroelectronics, Inc., Carrollton, TX (US); Hewlett-Packard Company, Palo Alto, CA (US)

( * ) Notice: Subject to any disclaimer, the term of this patent is extended or adjusted under 35 U.S.C. 154(b) by 2644 days.

(21) Appl. No.: 09/751,372

(22) Filed: Dec. 29, 2000

(65) Prior Publication Data

US 2002/0087839 A1    Jul. 4, 2002

(51) Int. Cl.
*G06F 9/30*      (2006.01)
(52) U.S. Cl. ........................... 712/204; 712/218
(58) Field of Classification Search ................. 712/204, 712/218; 711/138, 137; 708/209
See application file for complete search history.

(56) References Cited

U.S. PATENT DOCUMENTS 5,619,668 A * 4/1997 Zaidi ........................... 712/200
5,706,481 A * 1/1998 Hannah et al. ............... 345/519
5,761,469 A    6/1998 Greenley
5,887,160 A    3/1999 Lauritzen et al.

FOREIGN PATENT DOCUMENTS

WO    WO 94/08287    4/1994

OTHER PUBLICATIONS

Patterson et al., Computer Organization & Design: The Hardware/Software Interface, 1998, Morgan Kaufmann Publishers, p. 214.*
McGeer, Patrick C.; Brayton, Robert K.; Sangiovanni-Vincentelli, Alberto L.; and Sahni, Sartaj K. "Performance Enhancement through the Generalized Bypass Transform". IEEE © 1991. pp. 184-187.*
Berman, C. Leonard; Hathaway, David J.; LaPaugh, Andrea S.; and Trevillyan, Louise H. "Efficient Techniques for Timing Correction". IEEE © 1990. pp. 415-419.*

* cited by examiner

*Primary Examiner*—Aimee J Li
(74) *Attorney, Agent, or Firm*—Lisa K. Jorgenson; William A. Munck (57) ABSTRACT

There is disclosed a data processor that executes variable latency load operations using bypass circuitry that allows load word operations to avoid stalls caused by shifting circuitry. The processor comprises: 1) an instruction execution pipeline comprising N processing stages, each of the N processing stages for performing one of a plurality of execution steps associated with a pending instruction being executed by the instruction execution pipeline; 2) a data cache for storing data values used by the pending instruction; 3) a plurality of registers for receiving the data values from the data cache; 4) a load store unit for transferring a first one of the data values from the data cache to a target one of the plurality of registers during execution of a load operation; 5) a shifter circuit associated with the load store unit for shifting the first data value prior to loading the first data value into the target register; and 6) bypass circuitry associated with the load store unit for transferring the first data value from the data cache directly to the target register without processing the first data value in the shifter circuit.

29 Claims, 4 Drawing Sheets

SYSTEM AND METHOD FOR EXECUTING VARIABLE LATENCY LOAD OPERATIONS IN A DATE PROCESSOR

CROSS-REFERENCE TO RELATED APPLICATIONS

The present invention is related to those disclosed in the following U.S. patent applications:

1. Ser. No. 09/751,331, filed concurrently herewith, entitled "PROCESSOR PIPELINE STALL APPARATUS AND METHOD OF OPERATION";
2. Ser. No. 09/751,371, filed concurrently herewith, entitled "CIRCUIT AND METHOD FOR HARDWARE-ASSISTED SOFTWARE FLUSHING OF DATA AND INSTRUCTION CACHES";
3. Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";
4. Ser. No. 09/751,377, filed concurrently herewith, entitled "BYPASS CIRCUITRY FOR USE IN A PIPELINED PROCESSOR";
5. Ser. No. 09/751,410, filed concurrently herewith, entitled "SYSTEM AND METHOD FOR EXECUTING CONDITIONAL BRANCH INSTRUCTIONS IN A DATA PROCESSOR";
6. Ser. No. 09/751,408, filed concurrently herewith, entitled "SYSTEM AND METHOD FOR ENCODING CONSTANT OPERANDS IN A WIDE ISSUE PROCESSOR";
7. Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";
8. Ser. No. 09/751,674, filed concurrently herewith, entitled "CIRCUIT AND METHOD FOR INSTRUCTION COMPRESSION AND DISPERSAL IN WIDE-ISSUE PROCESSORS";
9. Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10. Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to a data processor capable of executing load operations having different latencies.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution advantage rate that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors. However, in many applications it is essential to minimize the size, cost, and power requirements of a data processor. This has led to the development of processors that are optimized to meet particular size, cost and/or power limits. For example, the recently developed Transmeta Crusoe™ processor reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices).

In general, an important design objective for data processors used in consumer appliances and office equipment is the minimization of cost and complexity of the data processor. One way to minimize cost and complexity is to exclude from the processor core functions that can be implemented with memory-mapped peripherals external to the core. For example, cache flushing may be performed using a small memory-mapped device controlled by a specialized software function. The cost and complexity of a data processor may also minimized by implementing extremely simple exception behavior in the processor core.

As noted above, a wide-issue processor pipeline executes bundles of operations in multiple stages. In a conventional data processor, the load operations performed by a memory unit have the same latency. However, this is done by design and is not an essential characteristic of all load operations. Some load operation could, in fact, be performed faster than other load operations but are padded with stall states in order to match the latency of the longest load operations. This has the disadvantage of decreasing processor throughput.

For example processor may execute a load word operation, a load half-word operation, and a load byte operation. A load word operation loads a 32 bits from, for example, the data cache into a register file. No additional alignment is required. A load half-word operation loads 16 bits into a register file and a load byte operation loads 8 bits into a register file. However, unlike the load word operation, the load half-word operation or the load byte operation may need to align the 16 bits or the 8 bits to certain bit positions before loading the register file. This requires that the data be sent through a shifter (or aligner) to align the data correctly. Since the load word operation does not require alignment, this adds unnecessary latency to a load operation. Alternatively, a single load operation with minimal latency may be implemented and a subsequent sign/zero extend operation may be executed to implement the necessary sub-word shifting. Unfortunately, this increases code size, since each load half-word operation and load byte operation requires an extra sign/zero extend operation.

Therefore, there is a need in the art for improved data processors in which the cost and complexity of the processor core is minimized while maintaining the processor throughput. In particular, there is a need for systems and methods for minimizing the latency of load operations in order to maximize the throughput of the data processor. More particularly, there is a need for systems and methods capable of minimizing the latency of load operations without using a single minimal-latency load operation followed by a subsequent sign/zero extend operation that performs sub-word shifting.

SUMMARY OF THE INVENTION

To address the above-discussed deficiencies of the prior art, it is a primary object of the present invention to provide a data processor capable of executing variable latency load operations using bypass circuitry that allows load word operations to avoid stalls caused by shifting circuitry. According to an advantageous embodiment of the present invention, the processor comprises: 1) an instruction execution pipeline comprising N processing stages, each of the N processing stages capable of performing one of a plurality of execution steps associated with a pending instruction being executed by the instruction execution pipeline; 2) a data cache capable of storing data values used by the pending instruction; 3) a plurality of registers capable of receiving the data values from the data cache; 4) a load store unit capable of transferring a first one of the data values from the data cache to a target one of the plurality of registers during execution of a load operation; 5) a shifter circuit associated with the load store unit capable of shifting the first data value prior to loading the first data value into the target register; and 6) bypass circuitry associated with the load store unit capable of transferring the first data value from the data cache directly to the target register without processing the first data value in the shifter circuit.

According to one embodiment of the present invention, the bypass circuitry transfers the first data value from the data cache directly to the target register during a load word operation.

According to another embodiment of the present invention, the bypass circuitry transfers the first data value from the data cache directly to the target register at the end of two machine cycles.

According to yet another embodiment of the present invention, the shifter circuit shifts the first data value prior to loading the first data value into the target register during a load half-word operation.

According to still another embodiment of the present invention, the shifter circuit loads the shifted first data value into the target register at the end of three machine cycles during a load half-word operation.

According to a further embodiment of the present invention, the shifter circuit shifts the first data value prior to loading the first data value into the target register during a load byte operation.

According to a still further embodiment of the present invention, the shifter circuit loads the shifted first data value into the target register at the end of three machine cycles during a load-byte operation.

According to one embodiment of the present invention, the bypass circuitry comprises a multiplexer having a first input channel coupled to a data output of the data cache. The multiplexer has a second input channel coupled to an output of the shifter circuit.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
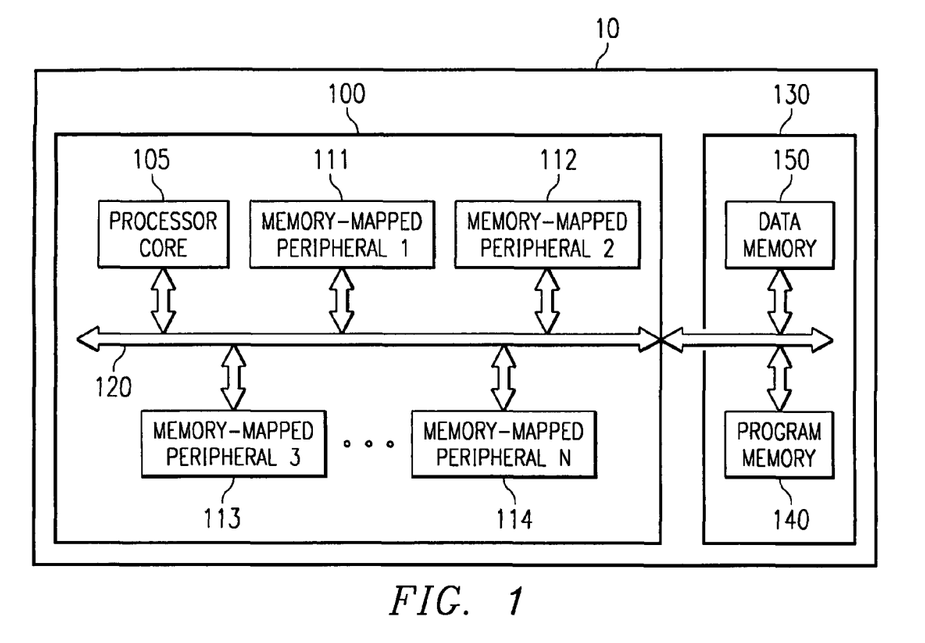
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111-114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111-114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111-114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111-114 may be externally coupled to data processor 100. Similarly, in another embodiment of the present invention, one or both of program memory 140 and data memory 150 may be disposed on-chip in data processor 100.

Figure 2:
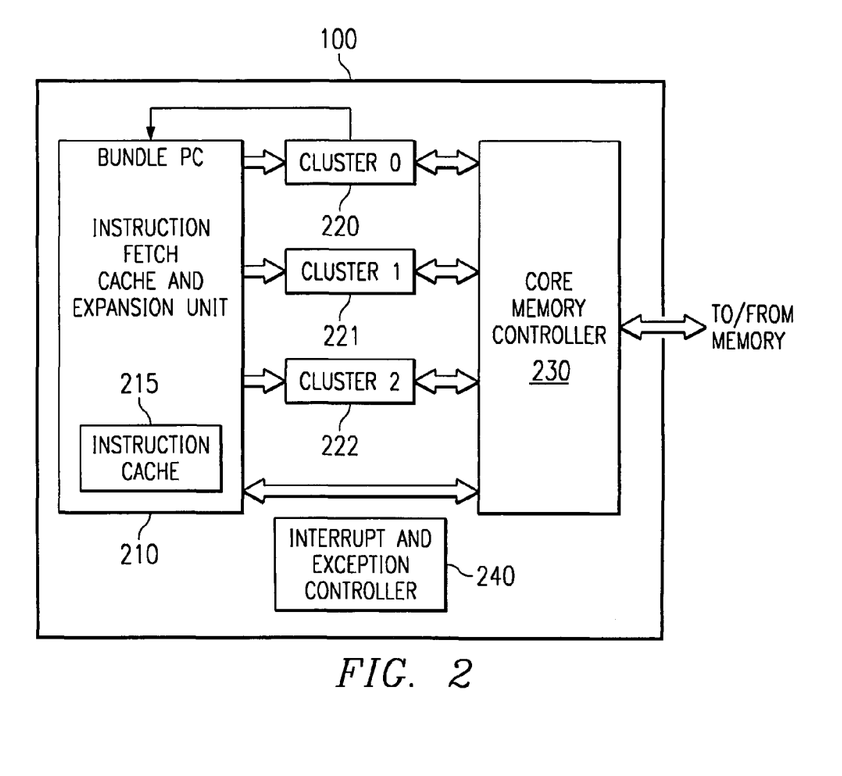
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220-222. Exemplary clusters 220-222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220-222 are basic execution units that comprise one more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
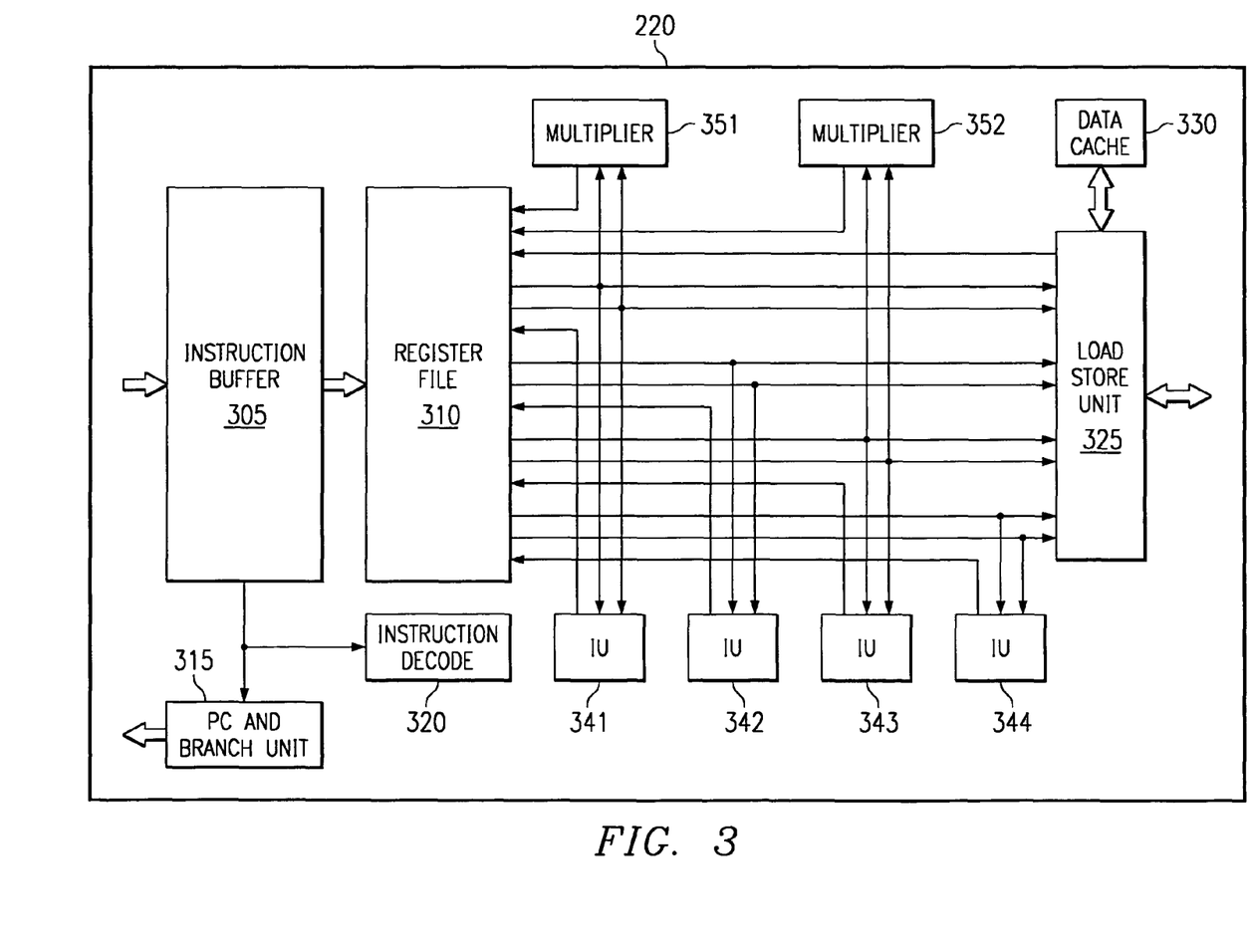
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341-344, and multipliers 351-352. Cluster 220 is implemented as an instruction pipeline.

Instructions are issued to an operand read stage associated with register file 310 and then propagated to the execution units (i.e., integer units 341-244, multipliers 351-352). Cluster 220 accepts one bundle comprising one to four syllables in each cycle. The bundle may consist of any combination of four integer operations, two multiplication operations, one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions — Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
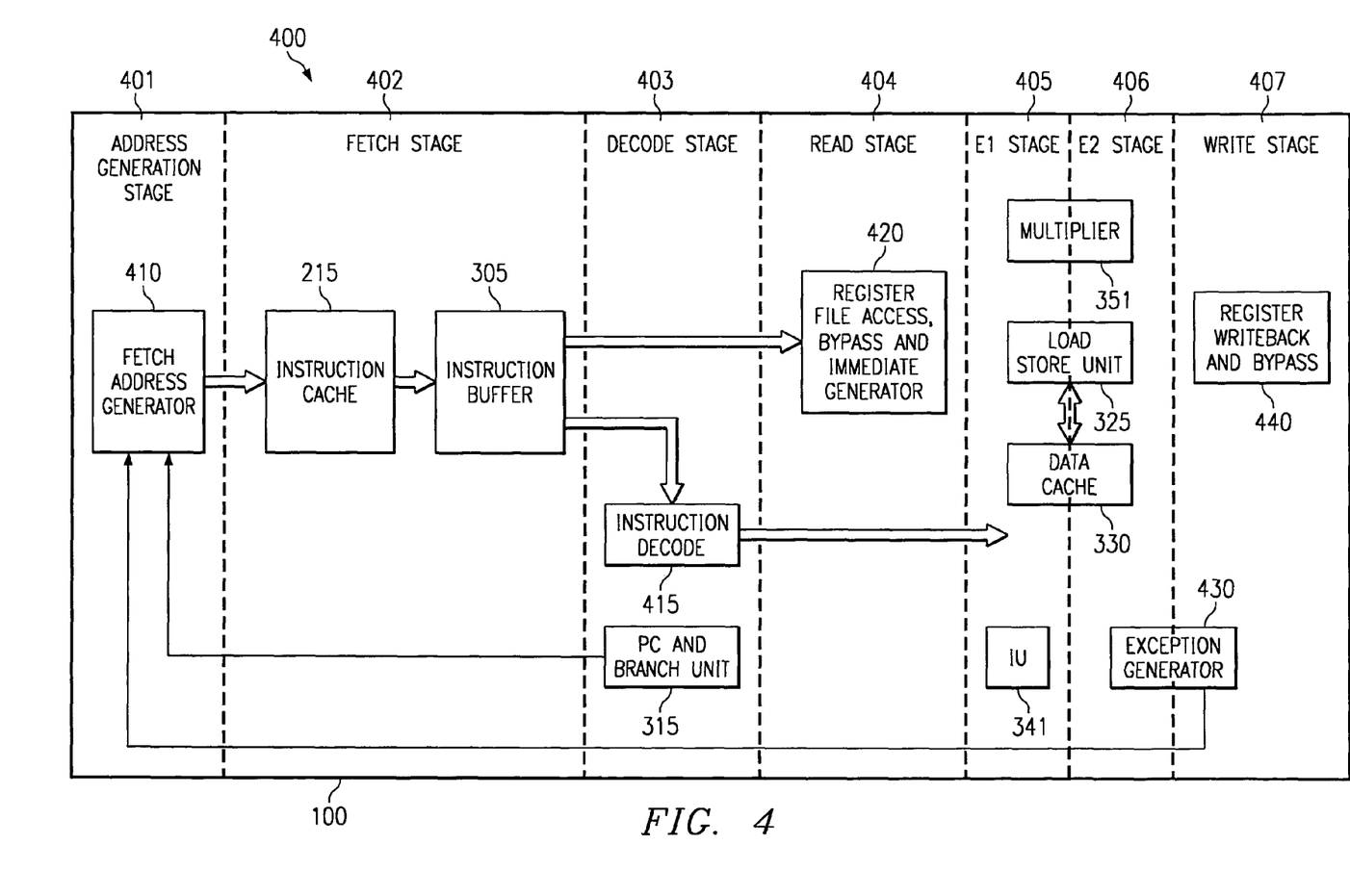
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted," are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

Load operations that transfer data from data cache 330 to the register files are performed in E1 stage 405, E2 stage 406, and write stage 407. Data shifting is performed early in write stage 407 prior to loading the data into the appropriate register file in register write back and bypass block 440. In order to maximize processor throughput, the present invention implements bypassing circuitry in the pipeline that permits data from load word operations to bypass the shifting circuitry in write stage 407.

Figure 5:
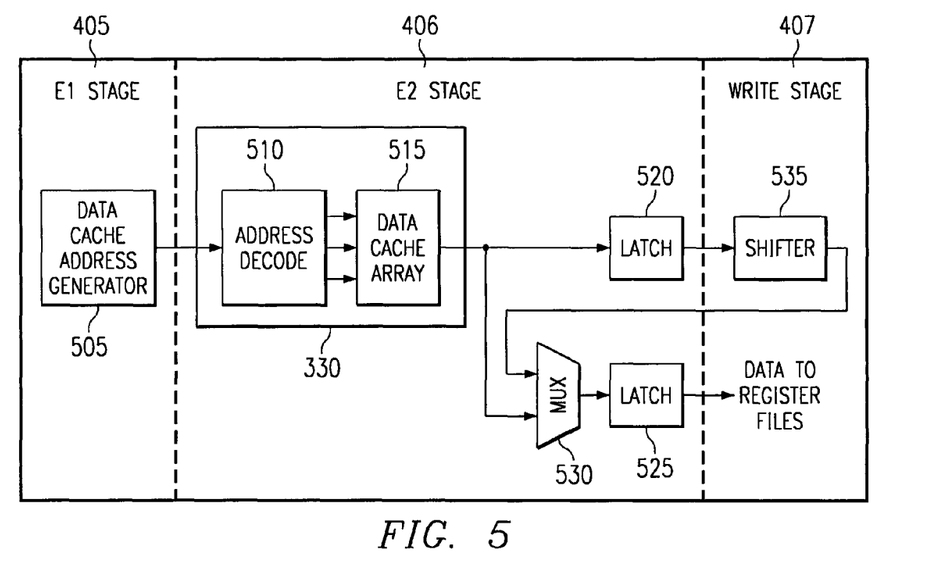
FIG. 5 is a block diagram illustrating selected portions of the load store unit and the data cache that contain bypassing circuitry used to achieve variable latencies in load operations in the exemplary data processor according to one embodiment of the present invention.

FIG. 5 is a block diagram illustrating selected portions of load store unit 325 and data cache 330 that implement bypassing circuitry used to achieve variable latencies in load operations in exemplary data processor 100 according to one embodiment of the present invention. In E1 stage 405, data cache address generation block 505 generates the address of the data to be loaded from data cache 330 into the target register file. Address decoder 510 receives and decodes the generated address and selects the requested data line in data cache array 515. The selected data (i.e., 32-bit word, 16-bit half word, or 8-bit byte) is then output from data cache 330.

In the case of load half-word operations and load-byte operations, the 16-bit half word or 8-bit byte is transferred into data latch 520 at the end of E2 stage 406. The 16-bit half word or 8-bit byte is then shifted by shifter 535 early in write stage 407 and the shifted data is then applied to one input channel of multiplexer (MUX) 530. The other input channel of MUX 530 directly receives the 32-bit word output by data cache 330 during load word operations. The output of MUX 530 is written to data latch 525 at the end of E2 stage 406. The output of data latch 525 writes the data to the target register file.

Figure 6:
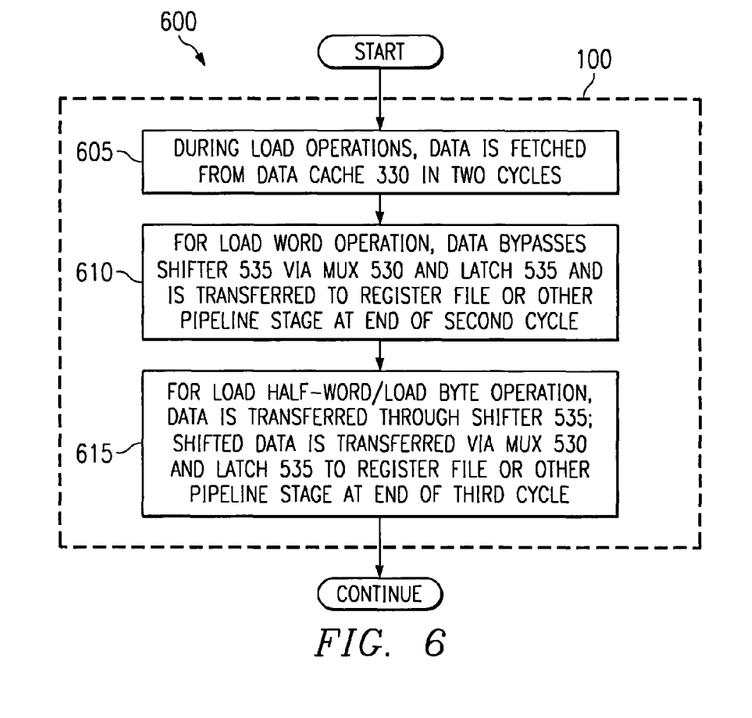
FIG. 6 is a flow diagram illustrating variable latency load operations in the exemplary data processor according to one embodiment of the present invention.

FIG. 6 depicts flow diagram 600, which illustrates load operations in exemplary data processor 100 according to one embodiment of the present invention. As described above, data is retrieved from data cache 330 in two machine cycles (i.e., E1 stage 405 and E2 stage 406) by generating a cache address and reading data from the selected cache line (process step 605). If the pending operation is a load word operation, the 32 bits of data bypass shifter 535 in write stage 407 and are loaded at the end of the second cycle (i.e., E2 stage 406) into the register file or another pipeline stage (process step 610). If the pending operation is a load half-word operation or a load byte operation, the retrieved data bits are transferred to shifter 535 in write stage 407 and shifted, sign-extended, or zero extended, depending on the type of memory load (signed/unsigned), during the third cycle so that the needed 16 bits or 8 bits are properly aligned. The shifted bits are loaded at the end of the third cycle into the register file or another pipeline stage (process step 615).

Although the present invention has been described in detail, those skilled in the art should understand that they can make various changes, substitutions and alterations herein without departing from the spirit and scope of the invention in its broadest form.

What is claimed is:

1. A data processor comprising:
an instruction execution pipeline comprising N processing stages, each of said N processing stages capable of performing one of a plurality of execution steps associated with a pending instruction being executed by said instruction execution pipeline;
a data cache capable of storing data values used by said pending instruction;
a plurality of registers capable of receiving said data values from said data cache;
a load store unit capable of transferring a first one of said data values from said data cache to a target one of said plurality of registers during execution of a load operation;
a shifter circuit associated with said load store unit capable of one of a) shifting, b) sign extending, or c) zero extending said first data value prior to loading said first data value into said target register; and
bypass circuitry associated with said load store unit capable of transferring said first data value from said data cache directly to said target register without processing said first data value in said shifter circuit.

2. The data processor as set forth in claim 1 wherein said bypass circuitry transfers said first data value from said data cache directly to said target register during a load word operation.

3. The data processor as set forth in claim 2 wherein said bypass circuitry transfers said first data value from said data cache directly to said target register at the end of two machine cycles.

4. The data processor as set forth in claim 1 wherein said shifter circuit one of a) shifts, b) sign extends, or c) zero extends said first data value prior to loading said first data value into said target register during a load half-word operation.

5. The data processor as set forth in claim 4 wherein said shifter circuit loads said shifted first data value into said target register at the end of three machine cycles.

6. The data processor as set forth in claim 1 wherein said shifter circuit one of a) shifts, b) sign extends, or c) zero extends said first data value prior to loading said first data value into said target register during a load byte operation.

7. The data processor as set forth in claim 6 wherein said shifter circuit loads said shifted first data value into said target register at the end of three machine cycles.

8. The data processor as set forth in claim 1 wherein said bypass circuitry comprises a multiplexer having a first input channel coupled to a data output of said data cache.

9. The data processor as set forth in claim 8 wherein said multiplexer has a second input channel coupled to an output of said shifter circuit.

10. A method of loading a first data value from a data cache into a target register of a plurality of registers, the method comprising the steps of:
determining if a pending instruction in an N-stage execution pipeline is one of a load word operation, a load half-word operation, and a load byte operation;
in response to a determination that the pending instruction is a load half-word operation, transferring the first data value from the data cache to a shifter circuit and shifting the first data value prior to loading the first data value into the target register;
in response to a determination that the pending instruction is a load byte operation, transferring the first data value from the data cache to the shifter circuit and shifting the first data value prior to loading the first data value into the target register; and
in response to a determination that the pending instruction is a load word operation, transferring the first data value from the data cache directly to the target register without processing the first data value in the shifter circuit.

11. The method as set forth in claim 10 wherein the step of transferring the first data value requires two machine cycles during a load word operation.

12. The method as set forth in claim 10 wherein the step of transferring the first data value requires three machine cycles during a load half-word operation.

13. The method as set forth in claim 10 wherein the step of transferring the first data value requires three machine cycles during a load byte operation.

14. A processing system comprising:
a data processor comprising:
an instruction execution pipeline comprising N processing stages, each of said N processing stages capable of performing one of a plurality of execution steps associated with a pending instruction being executed by said instruction execution pipeline;
a data cache capable of storing data values used by said pending instruction;
a plurality of registers capable of receiving said data values from said data cache;
a load store unit capable of transferring a first one of said data values from said data cache to a target one of said plurality of registers during execution of a load operation;
a shifter circuit associated with said load store unit capable of one of a) shifting, b) sign extending, or c) zero extending said first data value prior to loading said first data value into said target register; and
bypass circuitry associated with said load store unit capable of transferring said first data value from said data cache directly to said target register without processing said first data value in said shifter circuit;
a memory coupled to said data processor; and
a plurality of memory-mapped peripheral circuits coupled to said data processor for performing selected functions in association with said data processor.

15. The processing system as set forth in claim 14 wherein said bypass circuitry transfers said first data value from said data cache directly to said target register during a load word operation.

16. The processing system as set forth in claim 15 wherein said bypass circuitry transfers said first data value from said data cache directly to said target register at the end of two machine cycles.

17. The processing system as set forth in claim 14 wherein said shifter circuit one of a) shifts, b) sign extends, or c) zero extends said first data value prior to loading said first data value into said target register during a load half-word operation.

18. The processing system as set forth in claim 17 wherein said shifter circuit loads said shifted first data value into said target register at the end of three machine cycles.

19. The processing system as set forth in claim 14 wherein said shifter circuit one of a) shifts, b) sign extends, or c) zero extends said first data value prior to loading said first data value into said target register during a load byte operation.

20. The processing system as set forth in claim 19 wherein said shifter circuit loads said shifted first data value into said target register at the end of three machine cycles.

21. The processing system as set forth in claim 14 wherein said bypass circuitry comprises a multiplexer having a first input channel coupled to a data output of said data cache.

22. The processing system as set forth in claim 21 wherein said multiplexer has a second input channel coupled to an output of said shifter circuit.

23. A processor, comprising:
a cache;
a plurality of registers;
a shifter circuit capable of shifting, sign extending, or zero extending a data value from the cache and providing a modified data value to a target one of the registers; and
a bypass circuit capable of transferring the data value from the cache to the target register without processing the data value in the shifter circuit.

24. The processor of claim 23, wherein:
the data value is transferred from the cache to the target register via the bypass circuit during a load word operation; and
the data value is transferred from the cache to the target register via the shifter circuit during a load half-word operation or a load byte operation.

25. The processor of claim 24, wherein:
the bypass circuit is capable of transferring the data value from the cache to the target register at an end of two machine cycles; and the shifter circuit is capable of providing the modified data value to the target register at an end of three machine cycles.

26. The processor of claim 23, wherein the bypass circuit comprises a multiplexer having a first input coupled to the cache and a second input coupled to the shifter circuit.

27. A method, comprising:
shifting, sign extending, or zero extending a first data value from a cache and providing a modified first data value to a first of a plurality of registers; and
transferring a second data value from the cache to a second of the plurality of registers without shifting, sign extending, or zero extending the second data value.

28. The method of claim 27, wherein:
shifting, sign extending, or zero extending the first data value comprises shifting, sign extending, or zero extending the first data value in response to determining that a first pending instruction in a processor is a load byte operation or a load half-word operation; and
transferring the second data value comprises transferring the second data value to the second register in response to determining that a second pending instruction in the processor is a load word operation.

29. A system, comprising:
a processor comprising:
 a cache;
 a plurality of registers;
 a shifter circuit capable of shifting, sign extending, or zero extending a data value from the cache and providing a modified data value to a target one of the registers; and
 a bypass circuit capable of transferring the data value from the cache to the target register without processing the data value in the shifter circuit;
a memory coupled to the processor; and
a plurality of peripheral circuits capable of performing selected functions in association with the processor.

* * * * *

UNITED STATES PATENT AND TRADEMARK OFFICE
CERTIFICATE OF CORRECTION

| | | |
|---|---|---|
| PATENT NO. | : 7,757,066 B2 | Page 1 of 1 |
| APPLICATION NO. | : 09/751372 | |
| DATED | : July 13, 2010 | |
| INVENTOR(S) | : Jarvis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1759 days.

Signed and Sealed this
Twenty-fifth Day of September, 2012

David J. Kappos
*Director of the United States Patent and Trademark Office*